(12) United States Patent
Lee et al.

(10) Patent No.: US 7,007,196 B2
(45) Date of Patent: Feb. 28, 2006

(54) DATA STORAGE SYSTEM USING 3-PARTY HAND-OFF PROTOCOL TO FACILITATE FAILURE RECOVERY

(75) Inventors: Whay Sing Lee, Newark, CA (US); Nisha Talagala, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 553 days.

(21) Appl. No.: 10/166,975

(22) Filed: Jun. 10, 2002

(65) Prior Publication Data

US 2003/0229826 A1   Dec. 11, 2003

(51) Int. Cl.
*G06F 11/00* (2006.01)

(52) U.S. Cl. ............... 714/9; 714/27; 714/30
(58) Field of Classification Search ............ 714/9, 714/11, 30, 54, 8, 27, 31, 42
See application file for complete search history.

(56) References Cited

U.S. PATENT DOCUMENTS

| | | | |
|---|---|---|---|
| 5,263,034 A * | 11/1993 | Guenthner et al. | 714/47 |
| 5,435,000 A * | 7/1995 | Boothroyd et al. | 711/119 |
| 6,009,539 A * | 12/1999 | Ranson | 714/30 |
| 6,272,651 B1 * | 8/2001 | Chin et al. | 714/43 |
| 6,594,785 B1 * | 7/2003 | Gilbertson et al. | 714/48 |
| 6,857,050 B1 * | 2/2005 | Lee et al. | 711/141 |

* cited by examiner

*Primary Examiner*—Scott Baderman
*Assistant Examiner*—Joshua Lohn
(74) *Attorney, Agent, or Firm*—Robert C. Kowert; Meyertons, Hood, Kivlin, Kowert & Goetzel, P.C.

(57) ABSTRACT

A data storage system is disclosed in which a 3-party hand-off protocol is utilized to maintain a single coherent logical image. In particular, the functionality of the data storage system is separated into distinct processing modules. Each processing module is implemented in a distinct central processing unit (CPU). Alternatively, the first type processing module and the third type processing module can be implemented in a common CPU. Isolating the different functions of the data storage system into distinct CPUs facilitates failure recovery. A characteristic of the 3-party hand-off protocol is that, if an abnormal state occurs, a surviving module has sufficient information to proceed to recover from said abnormal state after detecting the abnormal state, without depending on a failing module, by retrying the data storage operation with another processing module or the failing module or cleaning up after the failed data storage operation, resulting in improved failure recovery.

24 Claims, 7 Drawing Sheets

Write Operation

**Read Operation
(Cache Hit)**

Stage Operation

Destage Operation

Metadata Update Handshake

Metadata Query Handshake

DATA STORAGE SYSTEM USING 3-PARTY HAND-OFF PROTOCOL TO FACILITATE FAILURE RECOVERY

BACKGROUND OF THE INVENTION

1. Field of the Invention

Embodiments of the present invention generally relate to data storage systems. More particularly, embodiments of the present invention relate to the field of architectures for implementing failure recovery.

2. Related Art

Advances in technology have been accompanied by a tremendous growth in available information. This available information has driven a demand for data storage systems that possess a wide range of functionality to deliver and store the available information. Typically, a variety of design choices are made to craft a data storage system that meets a particular set of design requirements. Generally, these design requirements include the number of ports for accessing the data, the particular data accessible through each port, and the architecture for maintaining coherency so that multiple external systems can access the data and, yet, have a similar view of the content in the data storage system to avoid corrupting the data.

Generally, a single-attached data storage system has a single physical connection port that is used to connect to external systems (e.g., a host computer). In this case, scalability is limited. Moreover, performance and capacity are highly dependent on the processing speed of the single-attached data storage system. Since only one port provides access to the data, there is little tolerance for port failures, reducing the system's availability and robustness.

A multi-attached data storage system has two or more physical connection ports that are used to connect to external systems (e.g., a host computer). Typically, the multi-attached data storage system provides improved scalability, performance, and capacity compared to the single-attached data storage system, along with greater failure tolerance and higher levels of availability and robustness. Here, a particular design choice has to be made: (case 1) whether the external system is allowed to access different portions of the stored data only via particular ports, or (case 2) whether the external system is allowed to access any portion of the stored data via any of the available ports at any time.

In case 1, each port is logically connected to a non-overlapping portion of the stored data. When there is a port failure, one of the surviving ports may take over the data portion that was previously accessed through the failed port. This is commonly known as an Active-Passive configuration.

The case 2 is known as an Active-Active configuration when there are only two ports. The two ports present a single coherent logical image of the stored data to the external systems. When there are an arbitrary number of ports, this case is known as an Active^N configuration.

Lastly, any data storage system accessible by multiple external systems usually implements a scheme for maintaining coherency. Various approaches have been implemented. Typically, these architectures require the performance of a locking operation before the data storage system can process a data access request (e.g., to read data, to write data, etc.) from an external system. In essence, the external system secures a lock on the particular portion of the stored data that the external system needs to access. A lock conflict occurs when one external system holds a lock on a portion of the stored data that another external system needs to access. Unfortunately, lock conflicts in such architectures severely limit scalability and performance.

SUMMARY OF THE INVENTION

A data storage system is disclosed in which a 3-party hand-off protocol is utilized to maintain a single coherent logical image. The data storage system provides a single coherent logical image to multiple external systems (e.g., a host computer) via multiple independent ports without performing a locking operation for each received request (e.g., to write, to read, etc.) from the multiple external systems, enhancing the scalability, performance, and robustness of the data storage system. The ports of the data storage system are configured according to an Active^N model in an embodiment. Moreover, the functionality of the data storage system is separated into distinct processing modules. There are at least three types of processing modules. These three kinds of processing modules function cooperatively to perform data storage operations via the 3-party hand-off protocol. At least two types of processing modules are required to cooperate in a hand-off manner to fully execute any data storage operation. The data storage system can have more than one of each type of processing modules to facilitate failure recovery and provide robustness.

In an embodiment, data in the data storage system is arranged into data blocks. A first type processing module (referred as a "line card") interfaces with external systems by providing multiple independent ports for communicating with the external systems and handles cache data in response to received requests (e.g., to read data, to write data, etc.) from the external systems. A second type processing module (referred as a "metadata controller") interfaces in a first hand-off manner with the first type processing module and manages metadata associated with the cache data and stored data by serializing the metadata manipulations associated with the cache data of a data block and associated with the stored data of a data block to provide a single coherent logical image through the multiple ports to the external systems. A third type processing module (referred as a "data mover") interfaces in a second hand-off manner with the second type processing module and handles the stored data including the cache data by being involved in the performance of background data storage operations, such as the staging and destaging of data blocks.

Additionally, in an embodiment, each processing module is implemented in a distinct central processing unit (CPU). Alternatively, the first type processing module and the third type processing module can be implemented in a common CPU. By isolating the different functions of the data storage system into distinct CPUs, modularity is introduced that allows optimization in the implementation of each kind of processing module and allows optimization in the number of each kind of processing modules implemented in the design of the data storage system. In addition, isolating the different functions of the data storage system into distinct CPUs facilitates failure recovery and promotes parallelism, allowing the handling of multiple parallel data flows simultaneously.

Moreover, at least two different types of processing modules function cooperatively in a hand-off manner to fully execute each data storage operation. Because of this, any abnormal state (e.g., failure of a processing module (failing module), performance degradation of a processing module (failing module), etc.) occurring during execution of a data storage operation can be detected by at least one of the different processing modules (surviving module) involved in executing the data storage operation. A characteristic of the 3-party hand-off protocol is that the surviving module has sufficient information to proceeds to recover from the abnormal state, without depending on the failing module, by retrying the data storage operation with another processing module or the failing module or cleaning up after the failed data storage operation, resulting in improved failure recovery and a more robust data storage system.

These and other advantages of the present invention will no doubt become apparent to those of ordinary skill in the art after having read the following detailed description of the preferred embodiments, which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

A data storage system utilizes a 3-party hand-off protocol to maintain a single coherent logical image. The data storage system provides a single coherent logical image to multiple external systems (e.g., one or more host computers) via multiple independent ports without performing a locking operation for each received request (e.g., to write, to read, etc.) from the multiple external systems, enhancing the scalability, performance, and robustness of the data storage system. Moreover, the 3-party hand-off protocol facilitates failure recovery. The ports of the data storage system are configured according to an Active^N model.

Figure 1:
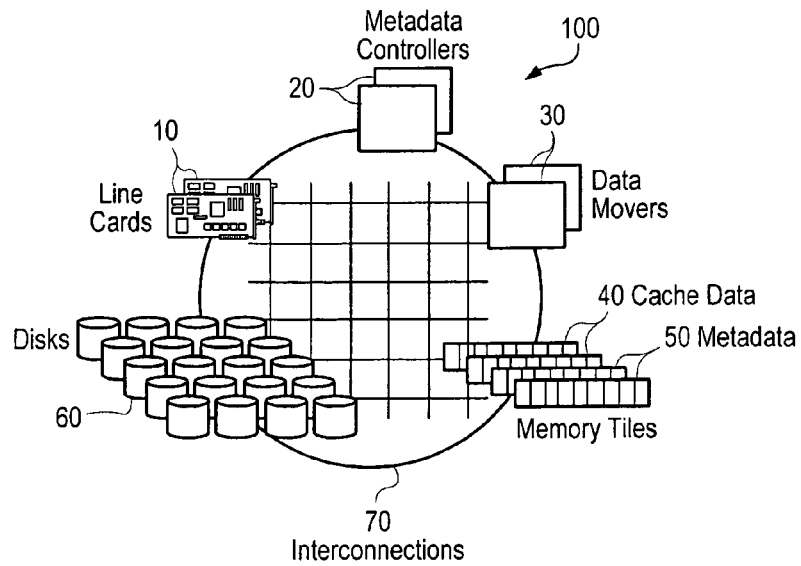
FIG. 1 illustrates a data storage system in accordance with an embodiment of the present invention.

FIG. 1 illustrates a data storage system 100 in accordance with an embodiment of the present invention. As depicted in FIG. 1, the data storage system 100 includes a plurality of disk drives 60 for storing a plurality of data, a plurality of memory modules 40 and 50, and a plurality of processing modules 10, 20, and 30. These components communicate with one another via the redundant interconnections 70. The number of each component included in the design of the data storage system 100 is configurable to meet the requirements of diverse data storage applications. The memory modules 40 and 50 (referred as "memory tiles") includes memory tiles 40 (or cache modules) for storing cache data and memory tiles 50 (or metadata store) for storing metadata associated with the cache data of the cache modules 40 and associated with the stored data of the disk drives 60.

The functionality of the data storage system 100 is separated into distinct processing modules 10, 20, and 30. There are at least three types of processing modules 10, 20, and 30. These three kinds of processing modules 10, 20, and 30 function cooperatively to perform data storage operations (e.g., write operation, read operation, stage operation, destage operation, etc.) via a 3-party hand-off protocol. At least two types of processing modules are required to cooperate in a hand-off manner to fully execute any data storage operation.

In an embodiment, data in the data storage system is arranged into data blocks. A first type processing module 10 (referred as a "line card") interfaces with external systems by providing multiple independent ports for communicating with the external systems and handles the cache data of the cache modules 40 in response to received requests (e.g., to read data, to write data, etc.) from the external systems. The line card 10 can also perform protocol translation. A second type processing module 20 (referred as a "metadata controller") interfaces in a first hand-off manner with the line card 10 and manages the metadata by serializing the metadata manipulations associated with the cache data of a data block and associated with the stored data of a data block to provide a single coherent logical image through the multiple ports to the external systems. A third type processing module 30 (referred as a "data mover") interfaces in a second hand-off manner with the metadata controller 20 and handles the stored data including the cache data by being involved in the performance of background data storage operations, such as the staging and destaging of data blocks between the cache modules 40 and the disk drives 60.

Each processing module 10, 20, and 30 can be implemented in firmware, software, hardware, or a combination thereof. In an embodiment, each processing module 10, 20, and 30 is implemented in a distinct central processing unit (CPU). Alternatively, the line card 10 and the data mover 30 can be implemented in a common CPU. By isolating the different functions of the data storage system 100 into distinct CPUs, modularity is introduced that allows optimization in the implementation of each kind of processing module and allows optimization in the number of each kind of processing modules implemented in the design of the data storage system 100. In addition, isolating the different functions of the data storage system 100 into distinct CPUs facilitates failure recovery and promotes parallelism, allowing the handling of multiple parallel data flows simultaneously.

Moreover, at least two different types of processing modules function cooperatively in a hand-off manner to fully execute each data storage operation. Because of this, any abnormal state (e.g., failure of a processing module (failing module), performance degradation of a processing module (failing module), etc.) occurring during execution of a data storage operation can be detected by at least one of the different processing modules (surviving module) involved in executing the data storage operation. A characteristic of the 3-party hand-off protocol is that the surviving module has sufficient information to proceeds to recover from the abnormal state, without depending on the failing module, by retrying the data storage operation with another processing module or the failing module or cleaning up after the failed data storage operation, resulting in improved failure recovery and a more robust data storage system 100.

Figure 2:
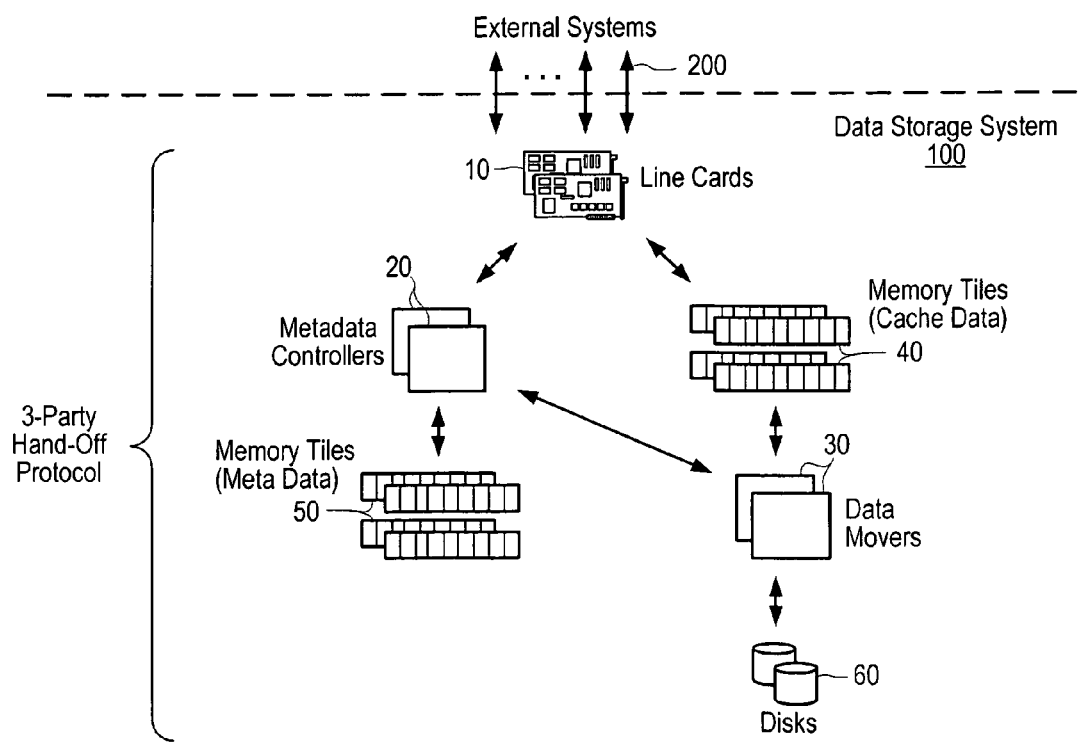
FIG. 2 illustrates a 3-party hand-off protocol utilized in the data storage system of FIG. 1 in accordance with an embodiment of the present invention.

FIG. 2 illustrates a 3-party hand-off protocol utilized in the data storage system 100 of FIG. 1 in accordance with an embodiment of the present invention. The line cards 10, the metadata controllers 20, and the data movers 30 function cooperatively to perform data storage operations (e.g., write operation, read operation, stage operation, destage operation, etc.) on data blocks via a 3-party hand-off protocol.

The line cards 10 provide front-end connectivity to the external systems 200 (e.g., host computers). Moreover, the line cards 10 are responsible for executing any necessary protocols (e.g., Fibre Channel, Network File System, iSCSI, etc.) for communicating with the external systems 200. Each line card 10 is capable of accepting a read request or a write request for any portion of the stored data including the cache data of the cache modules 40 and the disk drives 60, whereas the external systems 200 identify data block(s) when providing reading requests or writing requests. Thus, the line cards 10 are based on the Active^N model. Moreover, the line cards 10 move cache data (including any data received from the external systems) between the external systems 200 and the cache modules 40. Each line card 10 is pre-allocated a separate free space (e.g., pointers) in the cache modules 40 for depositing/writing any data received from the external systems 200 during a write operation. The line cards 10 are responsible for data flow between the external systems 200 and the data storage system 100. In addition, the line cards 10 forward control flow operations (metadata manipulations such as metadata queries and metadata updates) to the appropriate one of the metadata controllers 20. In sum, the line cards 10 communicate with the cache modules 40, the metadata controllers 20, and the external systems 200.

The metadata controllers 20 are responsible for managing and manipulating the metadata stored in the memory tiles 50, whereas the metadata is associated with the cache data (arranged into data blocks) of the cache modules 40 and the stored data (arranged into data blocks) of the disk drives 60. In addition, the metadata controllers 20 communicate with the memory tiles 50 (or metadata store) and the data movers 30. The metadata controllers 20 do not interface with the external systems 200. The metadata controllers 20 also manage the free space memory pool in memory tiles 40 and 50. When its free space in the memory tiles 40 and 50 runs low, a metadata controller 20 may instruct a data mover 30 to flush data blocks back into disks 60, and reclaim the corresponding memory tile space subsequently.

Each metadata controller 20 is responsible for managing the metadata corresponding to a non-overlapping region of data blocks. Hence, at any one time, one metadata controller 20 is solely responsible for the metadata manipulations of a data block. Since one metadata controller 20 may access the metadata for a data block, metadata manipulations of the data block's metadata can be serialized by the metadata controller 20, enabling the presentation of a single coherent logical image to the external systems 200. Moreover, because data flow between the external systems 200 and the data storage system 100 is handled by the line cards 10, the data storage system 100 is able to support a scalable, high performance Active^N model that allows the external systems 200 to request any operation (e.g., a read operation, a write operation, etc.) targeting any data block through any available port provided by the line cards 10 at any time without performing a locking operation for each received request from the external systems 200. Scalability is also achieved because the expensive operations can be replicated as much as necessary.

The metadata of each data block can include a corresponding pointer, a checksum, LRU (least recently used) information, and a last update identifier which represents the identifier of the CPU/operation that last updated the entry. Moreover, the metadata of each data block can also include a cache state that indicates if the data block is currently in a cache module 40 or on a disk drive 60 and a dirty bit for indicating whether the data block is dirty (e.g., cache data in the cache module 40 is modified but not yet flushed back to the disk drive 60). Moreover, each pointer stored in the memory tiles 50 is associated with a reference count. The reference count represents the number of read operations that are currently in the process of accessing a data block using the pointer.

The need for a reference count arises out of a requirement that an old pointer cannot be reclaimed into the free space memory pool in the cache module 40 (that is allocated to the line cards 10) unless the corresponding old data block is not needed anymore. Each write operation associated with a data block provided by the external system 200 requires a metadata update (e.g., update/change the pointer) associated with the data block since the data block is written to a free space in the cache modules 40 in each write operation. To ensure that an old pointer that points to the old data block is not reclaimed prematurely, the reference count is incremented whenever a line card 10 is reading from the corresponding data block or when a data mover 30 is reading the corresponding data block to be written back to a disk 60. Conversely, when the line card 10 or the data mover 30 completes accessing/reading the data block, the reference count is decremented. When the reference count is zero, the old pointer can be reclaimed into the free space memory pool of the cache module 40 (in the case that the data mover 30 is reading the corresponding data block, subject to the constraint that the corresponding dirty bit is cleared, i.e., the corresponding data block has been written back to disk 60). It is possible to maintain pointers to multiple versions of the data block. The last update identifier is used during fault recovery to enable the completion of a partially completed data storage operation.

In an embodiment, the metadata of each data block is associated with a corresponding lease. Leases are utilized to control access to the metadata to prevent one metadata controller 20 from corrupting metadata that does not belong to it. A metadata controller 20 acquires the lease corresponding to the metadata of a data block to perform metadata manipulations, such as metadata update and a metadata query/lookup. Since the lease expires rather than being permanently granted, no metadata controller 20 is able to monopolize a lease forever. Moreover, if the lease expires, the lease may be re-acquired by the previous metadata controller 20 or by a different metadata controller 20 because the previous metadata controller 20 may be overloaded or have failed. A lease implementation is disclosed in the co-pending patent application "HARDWARE ASSISTED LEASE-BASED ACCESS TO MEMORY" (Ser. No. 10/147,729, filed on May 16, 2002, assigned to the assignee of the present patent application), which is incorporated herein by reference.

The data movers 30 handle the background data storage operations, including the staging and the destaging of data blocks between disks 60 and the cache modules 40. The data movers 30 do not interface with the external systems 200. Moreover, the data movers 30 are responsible for keeping track of the free space in the disk drives 60. Each data mover 30 is allocated a non-overlapping region of free disk space for performing the destaging operations.

By dividing the functionality of the data storage system 100 into three categories, new opportunities are created to scale the data storage system 100 in different aspects according to need. For example, in a situation where a small amount of data capacity is shared by many external systems, a data storage system 100 with many line cards 10, but few metadata controllers 20 and data movers 30 may suffice. If the application has a highly random access pattern and thus requires frequent disk drive 60 accesses, the data storage system 100 may need many data movers 30. In an environment with truly coherent data sharing (e.g., clustering), more metadata controllers 20 can be used.

Figure 3:
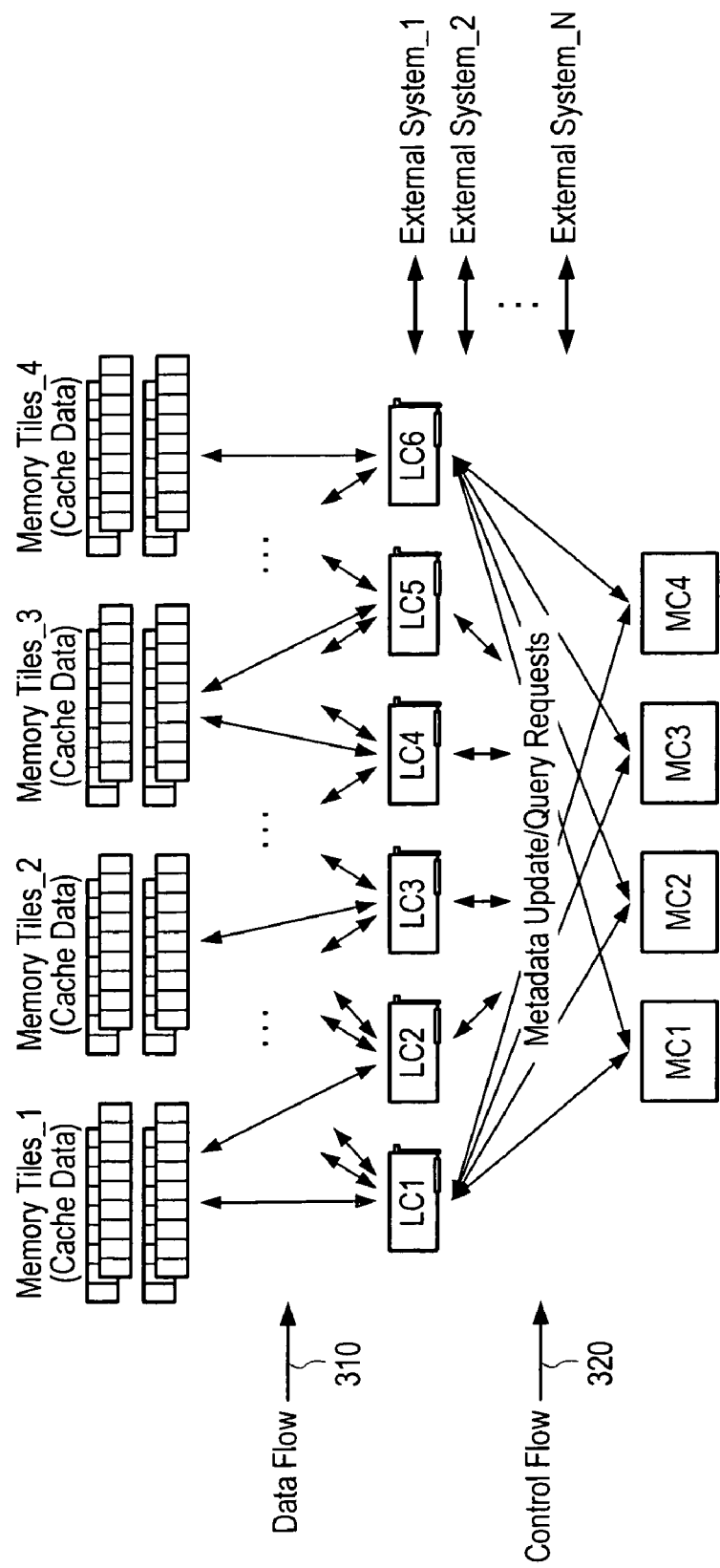
FIG. 3 illustrates operation of line cards and metadata controllers in accordance with an embodiment of the present invention.

FIG. 3 illustrates operation of line cards and metadata controllers in accordance with an embodiment of the present invention. As illustrated in FIG. 3, data flow 310 is separated from control flow 320. Each metadata controller MC1–MC4 is responsible for managing the metadata corresponding to a non-overlapping region of data blocks. Hence, at any one time, one metadata controller is solely responsible for the metadata manipulations of a data block. For example, the metadata manipulations of a particular data block would be handled by the same metadata controller, which performs each metadata manipulation (metadata update/query) atomically and serializes concurrently received metadata manipulation requests. The line cards LC1–LC6 can interface with the memory tiles 1–4 (or cache modules). Since in a write operation data is written to fresh locations in the memory tiles_1, the memory tiles_2, the memory tiles_3, and the memory tiles_4, multiple data flows 310 managed by the line cards LC1–LC6 can occur in parallel, even if they target the same data block, so long as the control flow 320 (metadata update/query) is managed in an atomic, serialized manner by the metadata controllers MC1–MC4. This enables the presentation of a single coherent logical image, while boosting performance through parallelism.

Figure 4:
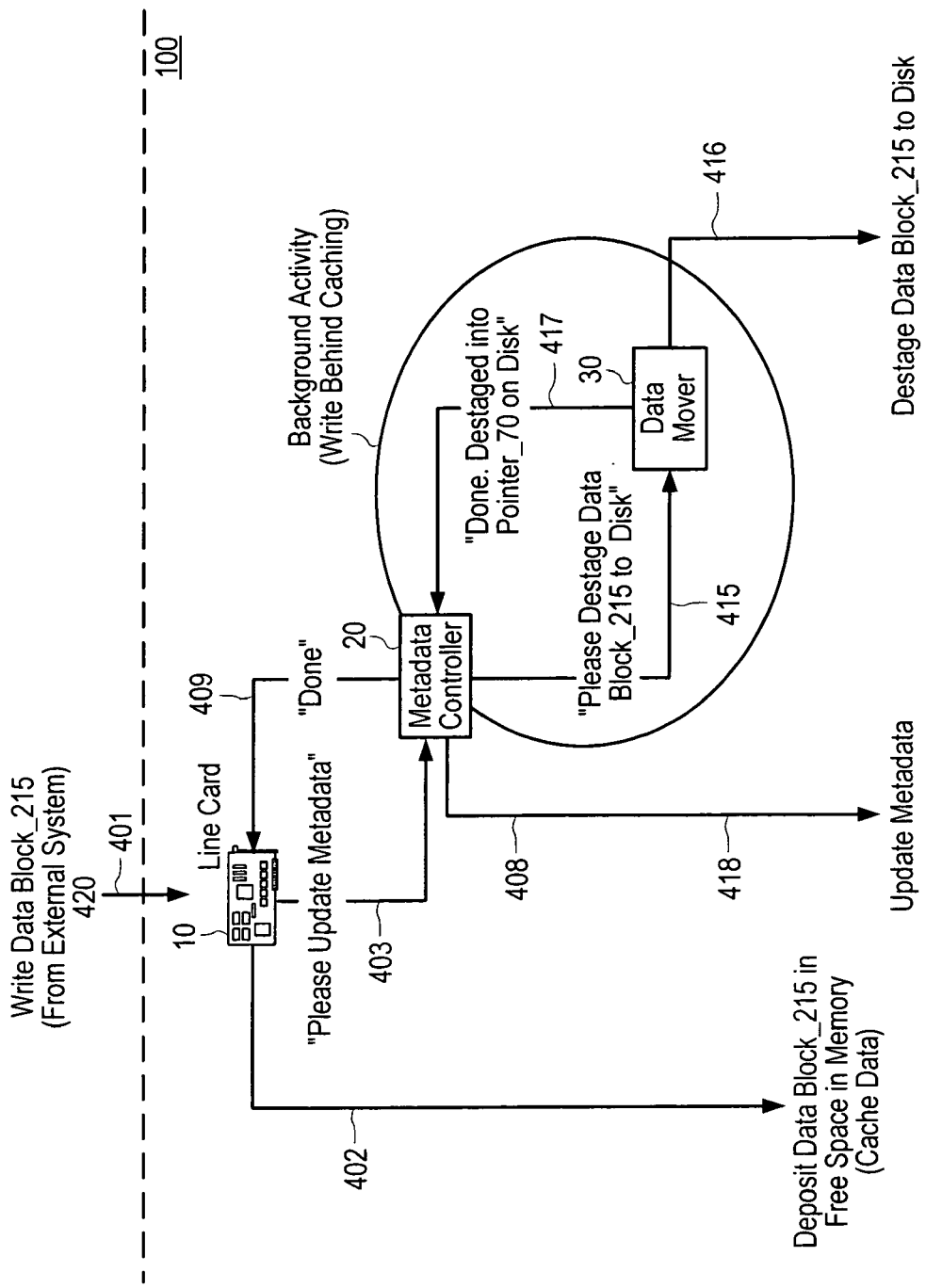
FIG. 4 illustrates operation of the 3-party hand-off protocol in response to a write request from an external system in accordance with an embodiment of the present invention.

FIG. 4 illustrates operation of the 3-party hand-off protocol in response to a write request from an external system 420 in accordance with an embodiment of the present invention. Moreover, FIG. 4 illustrates how the line card 10, the metadata controller 20, and the data mover 30 cooperate in a hand-off manner to execute the data storage operation. At arrow 401, the line card 10 receives a write request from an external system 420. The external system 420 provides the data block_215 to be written in the data storage system 100. The line card 10 deposits the given data block_215 in a free space in the cache module 40 (FIG. 2), at arrow 402. When completed, the line card 10 issues a metadata update request to the metadata controller 20 that is responsible for the metadata manipulations of data block_215, at arrow 403. The metadata update request includes the new pointer (in the cache module 40 (FIG. 2)) to the data block_215.

At arrow 408, the metadata controller 20 updates the metadata (stored in the memory tile 50 (FIG. 2)) associated with data block_215 to reflect the new location of the data block_215. Moreover, the corresponding dirty bit is set. At arrow 409, the metadata controller 20 returns an acknowledgement to the line card 10, which may at this point issue a confirmation to the external system 420.

At a later time, the metadata controller 20 may decide to flush the data block_215 into the disk drive 60 (FIG. 2). At arrow 415, the metadata controller 20 issues a destage request to a data mover 30. The destage request includes the pointer (in the cache module 40 (FIG. 2)) to the data block_215. The data mover 30 copies the data block_215 from the cache module 40 (FIG. 2) into a free space in the disk drive 60 (FIG. 2), at arrow 416. When the data mover 30 is done, the data mover 30 informs the metadata controller 20 to update the metadata (stored in the memory tile 50 (FIG. 2)) associated with data block_215 to reflect the new location (e.g., pointer_70 on disk drive) of the data block_215, at arrow 417. At arrow 418, the metadata controller 20 updates the metadata (stored in the memory tile 50 (FIG. 2)) associated with data block_215. At this point, the corresponding dirty bit is cleared and the metadata controller 20 may evict the data block_215 from the cache module 40 (FIG. 2) and reclaim the memory tile space to be used by other operations, or it may choose to do so at a later time.

Because the metadata for a given data block is manipulated by one metadata controller 20, the updates to the metadata of the given data block are serialized. Consequently, even when multiple external systems are writing to the same data block via multiple different line cards 10, each of the write operations will remain atomic, resulting in a single coherent logical image.

Figure 5:
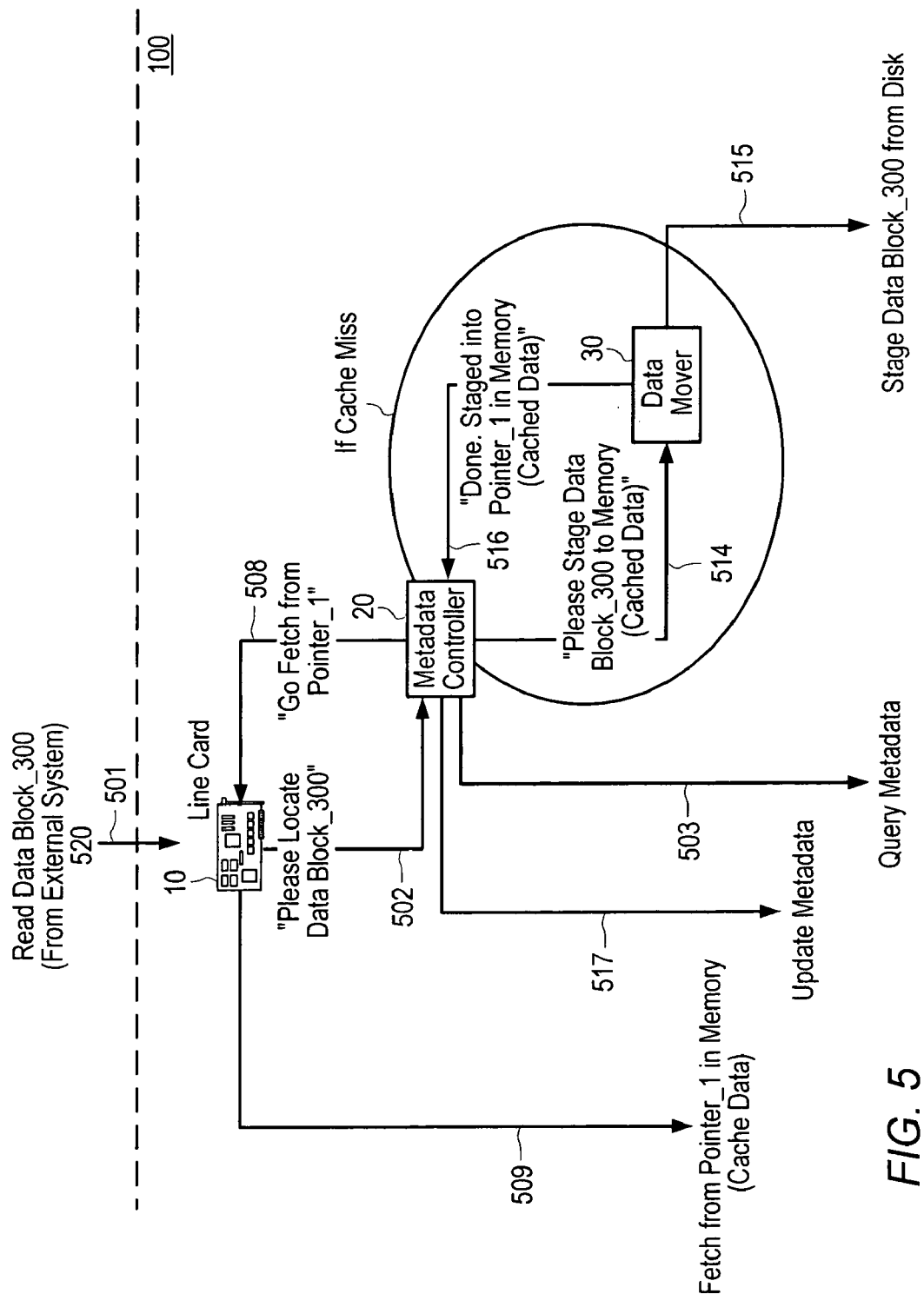
FIG. 5 illustrates operation of the 3-party hand-off protocol in response to a read request from an external system in accordance with an embodiment of the present invention.

FIG. 5 illustrates operation of the 3-party hand-off protocol in response to a read request from an external system 520 in accordance with an embodiment of the present invention. Moreover, FIG. 5 illustrates how the line card 10, the metadata controller 20, and the data mover 30 cooperate in a hand-off manner to execute the data storage operation. At arrow 501, the line card 10 receives a read request from an external system 520. The external system 520 identifies the data block_300 to be read from the data storage system 100. At arrow 502, the line card issues a metadata query/lookup request to the metadata controller 20 that is responsible for the metadata manipulations of data block_300.

The metadata controller 20 queries the metadata (stored in the memory tile 50 (FIG. 2)), at arrow 503. If the data block_300 is currently in the cache module 40 (FIG. 2), the metadata controller 20 returns the location (e.g., pointer_1) for the data block_300, at arrow 508. The line card 10 then fetches the data block_300 from the location (e.g., pointer_1) in the cache module 40 (FIG. 2), at arrow 509.

At arrow 514, if the data block_300 is not currently in the cache module 40 (FIG. 2), the metadata controller 20 instructs a data mover 30 to stage the data block_300 from the disk drive 60 (FIG. 2) to the cache module 40 (FIG. 2). At arrow 515, the data mover 30 copies the data block_300 from the disk drive 60 (FIG. 2) to the cache module 40 (FIG. 2). When the data mover 30 has completed staging the data block_300, the data mover 30 informs the metadata controller 20 of the new location (e.g., pointer_1) of the data block_300 in the cache module 40 (FIG. 2), at arrow 516. The metadata controller 20 updates the metadata (stored in the memory tile 50 (FIG. 2)) associated with data block_300 to reflect the new location of the data block_300, at arrow

517. Moreover, the metadata controller 20 returns the location (e.g., pointer_1) for the data block_300 to the line card 10 to complete the read operation.

Because data blocks are written into fresh locations, the data flow of a read operation can in fact progress in parallel with that of a write operation for the same data block. The metadata controller 20 ensures a single coherent logical image by updating the metadata atomically, and not reclaiming a pointer until all read operations that are dependent on the pointer are complete.

Figure 6:
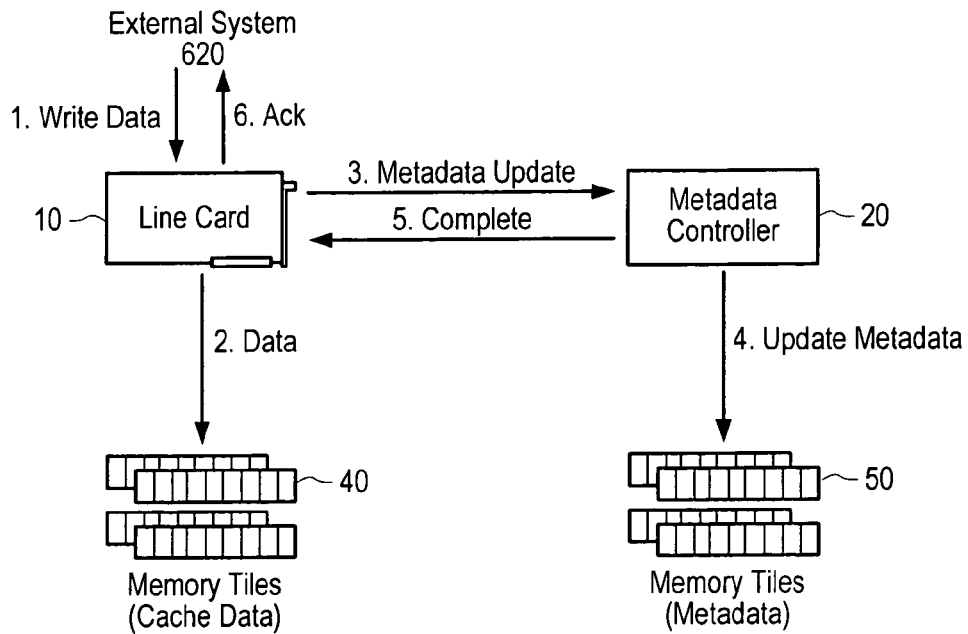
FIG. 6 illustrates a write operation in accordance with an embodiment of the present invention.

FIG. 6 illustrates a write operation in accordance with an embodiment of the present invention. At arrow 1, the external system 620 contacts a line card 10, providing a write request and a data block. The line card 10 proceeds to write the data block into a free area of the cache module 40 that has been pre-allocated for its use, at arrow 2. For reliability, the line card 10 writes two copies of the data block into physically distinct cache modules 40. Each line card 10 is pre-allocated with a pool of free memory area in the cache modules 40 for this purpose. When its free memory pool is nearly exhausted, the line card 10 makes a request for additional allocation of free memory area from the metadata controller 20.

Once the data block is stored in the cache module 40, the line card 10 sends the new pointer of the data block to an appropriate metadata controller 20 via a metadata update request, at arrow 3. The metadata controller 20 updates the metadata to reflect the new pointer of the modified data block, at arrow 4. The metadata controller 20 then informs the line card 20 that the new data block has been entered into the data storage system, at arrow 5. At this point, the line card 10 can return an acknowledgement to the external system 620, at arrow 6.

Figure 7:
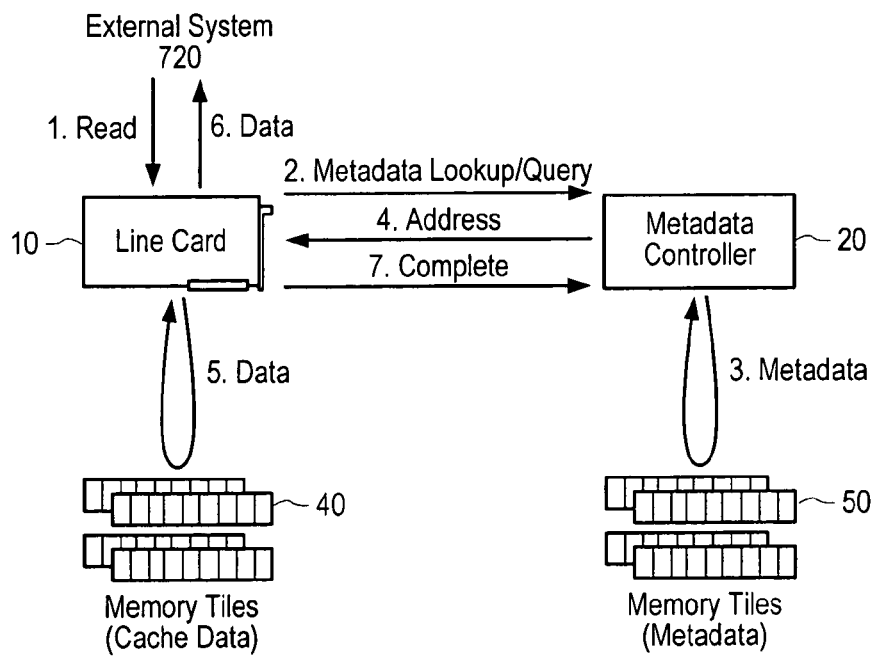
FIG. 7 illustrates a read operation in accordance with an embodiment of the present invention.

FIG. 7 illustrates a read operation (cache hit) in accordance with an embodiment of the present invention. The requested data block is in the cache module 40. At arrow 1, the line card 10 receives a read request for a data block. The line card 10 contacts an appropriate metadata controller 20 to determine the pointer of the data block via a metadata query/lookup request, at arrow 2. The metadata controller 20 queries the metadata stored in the memory tiles 50, obtains the pointer, and increments the reference count associated with the pointer, at arrow 3. The metadata controller 20 responds to the line card 10 with the address/pointer in the cache module 40 where the data block can be found, at arrow 4.

The line card 10 proceeds to read the data block from the cache module 40, at arrow 5. Moreover, the line card 10 sends the data block to the external system 720, at arrow 6. Once this is complete, the line card 10 contacts the metadata controller 20 to inform the metadata controller 20 that it has completed reading the data block, prompting the metadata controller to decrement the reference count associated with the pointer of the data block, at arrow 7.

Figure 8:
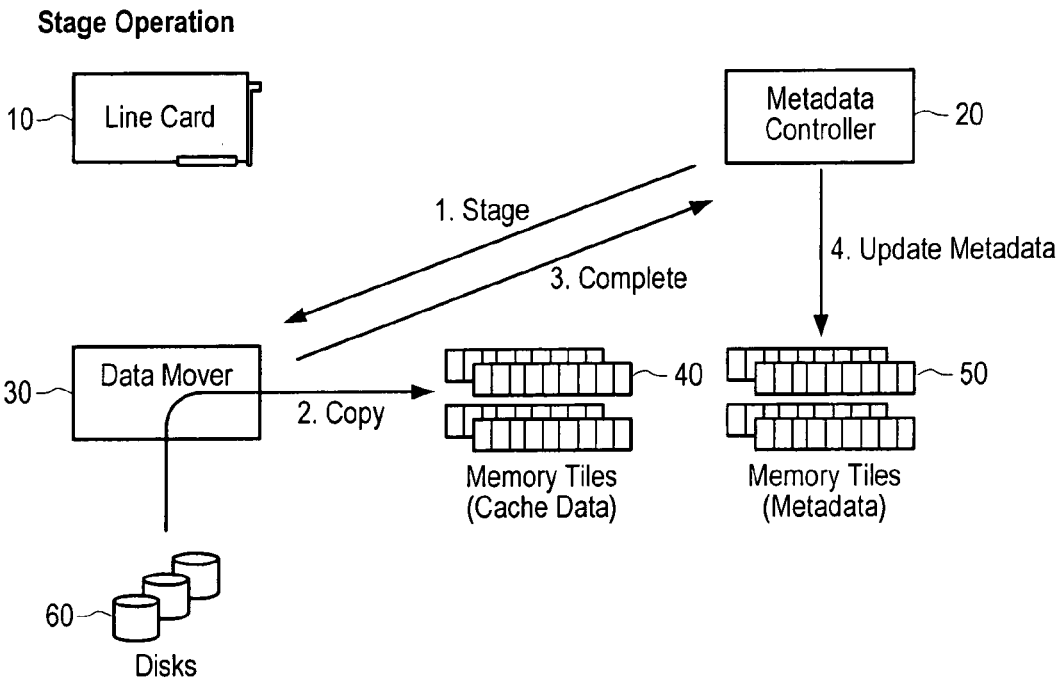
FIG. 8 illustrates a stage operation in accordance with an embodiment of the present invention.

FIG. 8 illustrates a stage operation in accordance with an embodiment of the present invention. In case of a cache miss during a read operation and in other cases (e.g., to exploit data locality), a data block has to be moved from the disk 60 to the cache module 40. At arrow 1, the metadata controller 20 allocates space in the cache module 40 and instructs a data mover 30 via a stage request to copy the data block from the disk 60 into the cache module 40. At arrow 2, the data mover 30 copies the data block from the disk 60 into the cache module 40. The metadata controller 20 is informed when the data block is deposited into the cache module 40, at arrow 3. The metadata controller 20 updates the metadata (stored in the memory tiles 50) associated with the data block to reflect it new location (e.g., pointer) in the cache module 40, at arrow 4.

Figure 9:
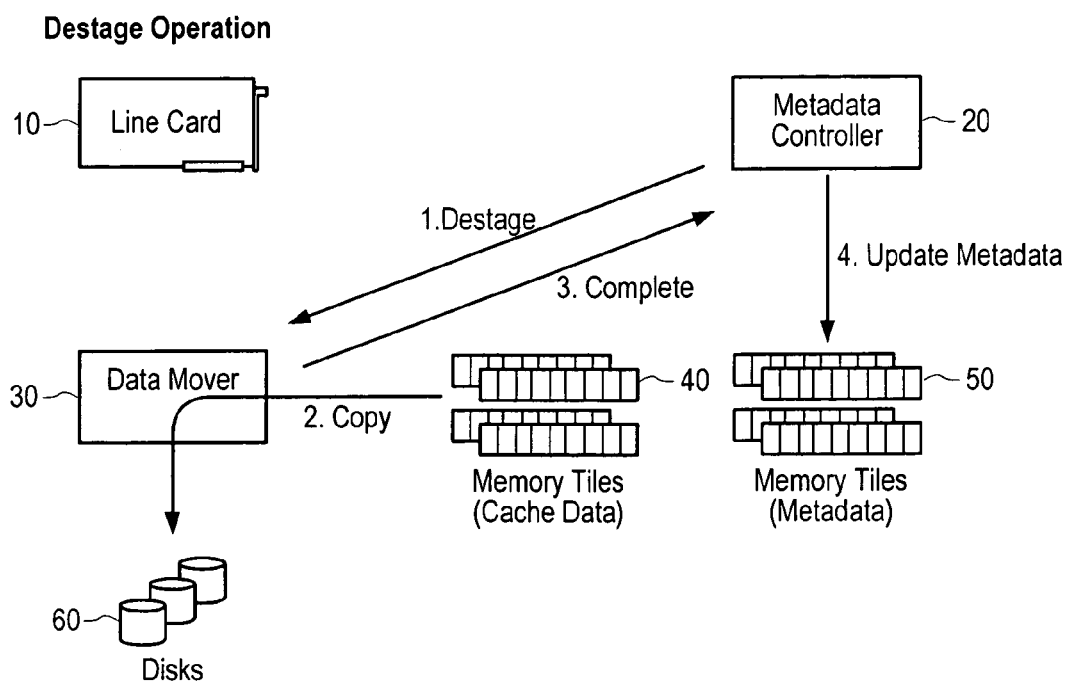
FIG. 9 illustrates a destage operation in accordance with an embodiment of the present invention.

FIG. 9 illustrates a destage operation in accordance with an embodiment of the present invention. Cached writes must eventually be flushed back from cache modules 40 onto disks 60 via destage operations. The metadata controller 20 periodically instructs the data mover 30 to copy a data block (e.g., that has updated metadata or data) from the cache modules 40 back to disk 60 via a destage request, at arrow 1. At arrow 2, the data mover 30 copies the data block from the cache module 40 into the disk 60. The metadata controller 20 is informed when the data block is deposited into the disk 60, at arrow 3. The metadata controller 20 updates the metadata (stored in the memory tiles 50) associated with the data block to reflect its new location (e.g., pointer) in the disk 60 and to tag the data block as a candidate for eviction from the cache module 40 (i.e., by clearing the corresponding dirty bit), at arrow 4. The memory tile space (in the cache module 40) storing the data block may be reclaimed immediately, or when needed subsequently, at the metadata controller's 20 discretion.

FIGS. 4–9 illustrate a characteristic property of the 3-party hand-off protocol: at least two processing modules (e.g., line card, metadata controller, and data mover) are involved in fully executing the necessary tasks of each data storage operation (e.g., read operation, write operation, stage operation, and destage operation). Thus, each processing module (e.g., line card, metadata controller, and data mover) is able to partially execute a group of data storage operations, whereas two distinct processing modules are required to cooperate in a hand-off manner to fully execute any of the data storage operations.

In an embodiment, each line card, each metadata controller, and each data mover is implemented in a distinct central processing unit (CPU). This implies that when a CPU (implementing the line card, metadata, or data mover) fails or experiences a degradation in performance during the execution of a data storage operation, there is at least one surviving CPU (implementing the line card, metadata, or data mover) to detect immediately this abnormal state. Moreover, because of the surviving-partnership property, the surviving CPU has sufficient information to proceed to recover from the abnormal state by either retrying the data storage operation with another CPU (implementing the line card, metadata, or data mover) or the failing CPU or cleaning up pending tasks after the failed data storage operation, thereby simplifying failure recovery and improving the robustness of the data storage system.

As an example, if a line card times out waiting for a failed metadata controller to respond to its metadata update request, the line card may redirect its request to an alternate metadata controller, triggering a distribution of responsibility for data blocks and mapping out the failed metadata controller in the process. It is possible to implement the line card and the data mover on a common CPU without compromising the surviving-partnership property.

If a processing module (e.g., line card, metadata controller, and data mover) detects an abnormal state by determining that the requested task handed-off to another processing module is not being performed up to a satisfactory level, the processing module may then seek to proceed to recover from the abnormal state by resubmitting its request to the same (failing) processing module, redirecting the same request to an alternate processing module, or cleaning up pending tasks after the failed data storage operation. The abnormal state may occur because of a malfunctioning processing module, an overloaded processing module, etc. The terms "get mad" refer to the situation where a processing module has detected an abnormal state and takes action to recover from the abnormal state, such as by forwarding the requested task to an alternate processing module.

Again referring to FIG. 8, the stage operation is executed by the metadata controller 20 and the data mover 30 to move a data block from the disk 60 into the cache module 40. During the execution of the stage operation, the metadata controller 20 may get mad at the data mover 30. Conversely, during the execution of the stage operation, the data mover 30 may get mad at the metadata controller 20.

When staging a data block from the disk 60 to the cache module 40, the metadata controller 20 provides a staging request to the data mover 30, whereas the staging request may include a disk-based pointer (where the data block is currently located in the disk 60) and a first cache-based pointer (free space in the cache module 40 where the data block should be deposited). The metadata controller 20 may detect an abnormal state caused by the data mover 30 not performing up to a satisfactory level or being unresponsive. Upon detecting the abnormal state, the metadata controller 20 proceeds to recover from the abnormal state. For example, the metadata controller 20 allocates another cache-based pointer and redirects the staging request to a different data mover, and if necessary to yet other data movers until the data storage system recovers from the abnormal state. Subsequently, the metadata controller 20 may reclaim the first cache-based pointer into its free space pool if the data mover 30 eventually completes the staging request task as well, or when time has elapsed sufficiently that the metadata controller 20 can assume the data mover 30 most likely is broken or inoperable. Hence, the failure recovery implemented by the metadata controller 20 provides a robust data storage system.

As depicted in FIG. 8, it is possible that an abnormal state can arise after the metadata controller 20 issues a staging request (at arrow 1) because the metadata controller 20 becomes faulty or overloaded, causing the metadata controller 20 to be unable to receive an acknowledgement (at arrow 3) from the data mover 30 when the data mover 30 completes its task (which triggers an update of the metadata to reflect the new location of the data block in the cache module 40). In this case, the data mover 30 may trigger a clean-up response by sending the acknowledgement to an alternate metadata controller, which then attempts to acquire the appropriate lease to the metadata of the data block to complete the metadata update. If necessary, the metadata manipulation responsibilities of the metadata controller 20 can be re-allocated to one or more alternate metadata controllers. Hence, the failure recovery implemented by the data mover 30 provides a robust data storage system.

Again referring to FIG. 9, the destage operation is executed by the metadata controller 20 and the data mover 30 to move a data block from the cache module 40 into the disk 60. During the execution of the destage operation, the metadata controller 20 may get mad at the data mover 30. Conversely, during the execution of the destage operation, the data mover 30 may get mad at the metadata controller 20.

When destaging a data block from the cache module 40 to the disk 60, the metadata controller 20 provides a destaging request to the data mover 30, whereas the destaging request may include a cache-based pointer in the cache module 40 where the data block is currently located. The data mover 30 has to allocate disk space and copy the data block from the cache module 40 to the disk 60. The metadata controller 20 may detect an abnormal state caused by the data mover 30 not performing up to a satisfactory level or being unresponsive. Upon detecting the abnormal state, the metadata controller 20 proceeds to recover from the abnormal state. For example, the metadata controller 20 redirects the destaging request to a different data mover, and if necessary to yet other data movers until the data storage system recovers from the abnormal state. Since each data mover is responsible for a non-overlapping region of free disk space, the data movers cannot interfere with one another. If both data movers eventually complete the requested destaging task, the metadata controller 20 can simply ask the data mover that gets done later to reclaim the disk space allocated for the destaging task back into its free disk space pool. In sum, the failure recovery implemented by the metadata controller 20 provides a robust data storage system.

As depicted in FIG. 9, it is possible that an abnormal state can arise after the metadata controller 20 issues a destaging request (at arrow 1) because the metadata controller 20 becomes faulty or overloaded, causing the metadata controller 20 to be unable to receive an acknowledgement (at arrow 3) from the data mover 30 when the data mover 30 completes its task (which triggers an update of the metadata to reflect the new location of the data block in the disk 60). In this case, the data mover 30 may reclaim the disk space allocated for the destaging operation into a free disk space pool after a sufficient time out period. Alternatively, the data mover 30 may trigger a clean-up response by sending the acknowledgement to an alternate metadata controller, which then attempts to acquire the appropriate lease to the metadata of the data block to complete the metadata update. If necessary, the metadata manipulation responsibilities of the metadata controller 20 can be re-allocated to one or more alternate metadata controllers. In sum, the failure recovery implemented by the data mover 30 provides a robust data storage system.

Again referring to FIG. 6, the write operation is executed by the metadata controller 20 and the line card 10. During the execution of the write operation, the metadata controller 20 may get mad at the line card 10. Conversely, during the execution of the write operation, the line card 10 may get mad at the metadata controller 20. Moreover, to avoid repeating write operations in case an abnormal state arises during the execution of the write operation, a metadata update handshake protocol is used between the line card 10 and the metadata controller 20, whereas the metadata update handshake protocol is similar to a two-phase commit.

Figure 10:
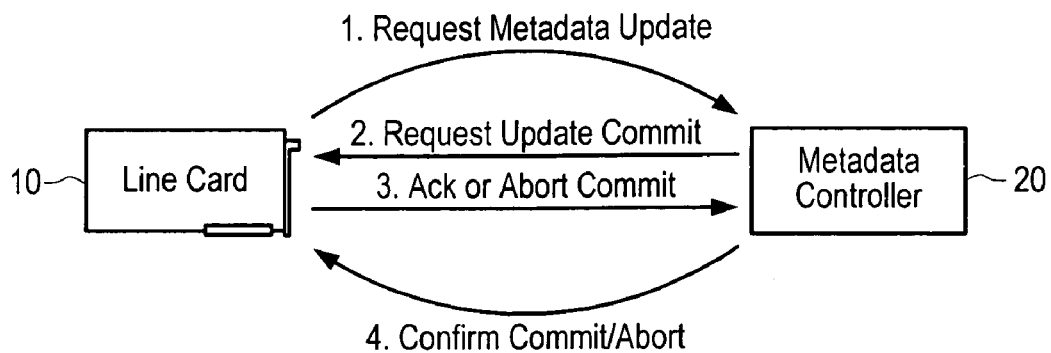
FIG. 10 illustrates a metadata update handshake protocol in accordance with an embodiment of the present invention.

FIG. 10 illustrates a metadata update handshake protocol in accordance with an embodiment of the present invention. At arrow 1, the line card 10 begins by sending the metadata update request. The metadata controller 20 saves away the prior version of the affected metadata, performs the requested metadata update, and returns a permission to commit request, at arrow 2. In response, the line card 10 may provide either a commit or an abort directive, at arrow 3. A failure to respond is considered an abort.

A commit directive (at arrow 30) informs the metadata controller 20 that the line card 10 is aware of the metadata update, and that the metadata controller may make the metadata update visible to the rest of the data storage system. Otherwise, the metadata controller 20 rolls back the changes to the metadata using the saved prior version of the metadata. In either case, the metadata controller 20 provides a confirmation that completes the interaction between the line card 10 and the metadata controller 20, at arrow 4.

The line card 10 may detect an abnormal state caused by the metadata controller 20 not performing up to a satisfactory level or being unresponsive. Upon detecting the abnormal state, the line card 10 proceeds to recover from the abnormal state. For example, the line card 10 redirects the metadata update request to a different metadata controller 20, and if necessary to yet other metadata controllers until the data storage system recovers from the abnormal state. These alternate metadata controllers then attempt to acquire the appropriate lease to the metadata of the data block to complete the metadata update. If necessary, the metadata manipulation responsibilities of the metadata controller 20 can be re-allocated to one or more alternate metadata controllers.

With this metadata update handshake protocol, the line card 10 is given the ability to undo any metadata update operation for which it had issued redundant requests. By tagging each metadata update operation with a unique identifier, the line card 10 may recognize and filter out redundant instances of the metadata update operation by aborting the permission to commit request from the alternate metadata controllers. In sum, the failure recovery implemented by the line card 10 provides a robust data storage system.

The metadata controller 20 may detect an abnormal state caused by the line card 10 not performing up to a satisfactory level or being unresponsive. Upon detecting the abnormal state, the metadata controller 20 proceeds to recover from the abnormal state. For example, the metadata controller 20 rolls back any modifications to the metadata if the line card 10 fails to provide either a commit or an abort directive, at arrow 3. Moreover, the metadata controller 20 may trigger a clean-up response. If necessary, the responsibilities of the line card 10 can be re-allocated to one or more alternate line cards. Thus, the failure recovery implemented by the metadata controller 20 provides a robust data storage system.

Again referring to FIG. 7, the read operation (cache hit) is executed by the metadata controller 20 and the line card 10. During the execution of the read operation, the metadata controller 20 may get mad at the line card 10. Conversely, during the execution of the read operation, the line card 10 may get mad at the metadata controller 20. Moreover, to avoid repeating read operations in case an abnormal state arises during the execution of the read operation, a metadata query handshake protocol is used between the line card 10 and the metadata controller 20, whereas the metadata query handshake protocol is similar to a two-phase commit.

Figure 11:
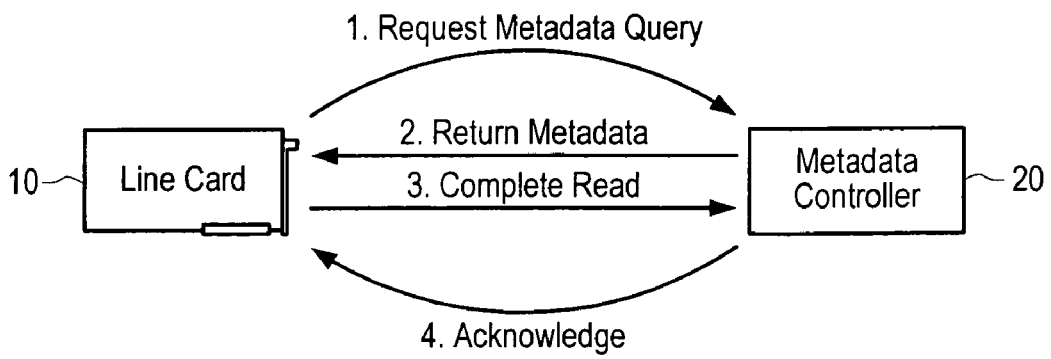
FIG. 11 illustrates a metadata query handshake protocol in accordance with an embodiment of the present invention.

FIG. 11 illustrates a metadata query handshake protocol in accordance with an embodiment of the present invention. At arrow 1, the line card 10 sends a metadata lookup/query request to the metadata controller 20. The metadata controller 20 retrieves the pointer for the request data block, and increments the reference count associated with the pointer before the metadata controller 20 delivers the pointer to the line card 10, at arrow 2. The line card 10 proceeds to fetch the data block from the cache module 40 (FIG. 7) and informs the metadata controller 20 after completing reading the data block, at arrow 3. At this point, the metadata controller 20 decrements the reference count, and completes the transaction by sending an acknowledgement to the line card 10, at arrow 4. Then, the line card 10 may send the data block to the external system 720 (FIG. 7), since the acknowledgement assures the line card 10 that the data block is not stale.

The line card 10 may detect an abnormal state caused by the metadata controller 20 not performing up to a satisfactory level or being unresponsive. Upon detecting the abnormal state, the line card 10 proceeds to recover from the abnormal state. For example, the line card 10 redirects the metadata query request to a different metadata controller 20, and if necessary to yet other metadata controllers until the data storage system recovers from the abnormal state. These alternate metadata controllers then attempt to acquire the appropriate lease to the metadata of the data block to complete the metadata query request. If necessary, the metadata manipulation responsibilities of the metadata controller 20 can be re-allocated to one or more alternate metadata controllers. In sum, the failure recovery implemented by the line card 10 provides a robust data storage system.

The metadata controller 20 may detect an abnormal state caused by the line card 10 not performing up to a satisfactory level or being unresponsive. Upon detecting the abnormal state, the metadata controller 20 proceeds to recover from the abnormal state. For example, the metadata controller 20 may roll back any modifications to the metadata, if necessary. However, since the line card 10 sends the data block to the external system after receiving an acknowledgement from the metadata controller 20 (at arrow 4), the metadata controller 20 may nonetheless decrement the reference count if the line card 10 fails to inform the metadata controller 20 that it completed reading the data block (at arrow 3) as long as the metadata controller 20 eventually also withholds its acknowledgement to the line card 10. Moreover, the metadata controller 20 may trigger a clean-up response. If necessary, the responsibilities of the line card 10 can be re-allocated to one or more alternate line cards. Hence, the failure recovery implemented by the metadata controller 20 provides a robust data storage system.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A data storage system, comprising:
   a first type processing module for partially executing a first group of data storage operations;
   a second type processing module for partially executing a second group of data storage operations; and
   a third type processing module for partially executing a third group of data storage operations, wherein at least two of said first, second, and third type processing modules are required to cooperate in a hand-off manner to fully execute any of said data storage operations; and
   wherein a particular module of said first, second and third type processing modules involved in executing said particular data storage operation is configured to detects an abnormal state arising when attempting to fully execute a particular data storage operation and in response to said detecting, the particular module is further configured to recover from said abnormal state.

2. A data storage system as recited in claim 1 wherein said first group comprises a read operation and a write operation.

3. A data storage system as recited in claim 1 wherein said second group comprises a read operation, a write operation, a stage operation, and a destage operation.

4. A data storage system as recited in claim 1 wherein said third group comprises a stage operation and a destage operation.

5. A data storage system as recited in claim 1 wherein said particular module proceeds to recover from said abnormal state by retrying said particular data storage operation with another module.

6. A data storage system as recited in claim 1 wherein said particular module proceeds to recover from said abnormal state by cleaning up a pending task of said particular data storage operation.

7. A data storage system as recited in claim 1 wherein said first type processing module, said second type processing module, and said third type processing module are each implemented in a plurality of distinct central processing units.

8. A data storage system as recited in claim 1 wherein said first type processing module and said third type processing module are implemented in a common central processing units.

9. A data storage system, comprising:
   a) a disk drive for storing a plurality of data;
   b) a first memory for storing a plurality of cache data;
   c) a second memory for storing metadata associated with stored data including said cache data and said data;
   d) a first type processing module for partially executing a first group of data storage operations and for handling said cache data;
   e) a second type processing module for partially executing a second group of data storage operations and for managing said metadata; and
   f) a third type processing module for partially executing a third group of data storage operations and for handling said data and said cache data, wherein at least two of said first, second, and third type processing modules are required to cooperate in a hand-off manner to fully execute any one of said data storage operations; and
   wherein a particular module of said first, second, and third type processing modules involved in executing said particular data storage operation is configured to detects an abnormal state arises when attempting to fully execute a particular data storage operation and in response to said detecting, the particular module is further configured to recover from said abnormal state.

10. A data storage system as recited in claim 9 wherein said first group comprises a read operation and a write operation.

11. A data storage system as recited in claim 9 wherein said second group comprises a read operation, a write operation, a stage operation, and a destage operation.

12. A data storage system as recited in claim 9 wherein said third group comprises a stage operation and a destage operation.

13. A data storage system as recited in claim 9 wherein said particular module proceeds to recover from said abnormal state by retrying said particular data storage operation with another module.

14. A data storage system as recited in claim 9 wherein said particular module proceeds to recover from said abnormal state by cleaning up a pending task of said particular data storage operation.

15. A data storage system as recited in claim 9 wherein said first type processing module, said second type processing module, and said third type processing module are each implemented in a plurality of distinct central processing units.

16. A data storage system as recited in claim 9 wherein said first type processing module and said third type processing module are implemented in a common central processing unit.

17. A method of responding to a plurality of requests from one or more external systems received by a data storage system, comprising:
   a) accessing each request at said data storage system comprising a first type processing module for partially executing a first group of data storage operations, a second type processing module for partially executing a second group of data storage operations, and a third type processing module for partially executing a third group of data storage operations;
   b) in response to each request, fully executing a corresponding one of said data storage operations by using at least two of said first, second, and third type processing modules cooperating in a hand-off manner; and
   c) detecting an abnormal state arising during said b) and in response to said detecting, proceeding to recover from said abnormal state by using a particular module of said first, second, and third type processing modules involved in executing said corresponding data storage operation.

18. A method as recited in claim 17 wherein said first group comprises a read operation and a write operation.

19. A method as recited in claim 17 wherein said second group comprises a read operation, a write operation, a stage operation, and a destage operation.

20. A method as recited in claim 17 wherein said third group comprises a stage operation and a destage operation.

21. A method as recited in claim 17 wherein said proceeding to recover from said abnormal state comprises:
   retrying said corresponding data storage operation with another module.

22. A method as recited in claim 17 wherein said proceeding to recover from said abnormal state comprises:
   cleaning up a pending task of said corresponding data storage operation.

23. A method as recited in claim 17 wherein said first type processing module, said second type processing module, and said third type processing module are each implemented in a plurality of distinct central processing units.

24. A method as recited in claim 17 wherein said first type processing module and said third type processing module are implemented in a common central processing unit.

* * * * *